ent Number: 4,590,490
Date of Patent: May 20, 1986

United States Patent [19]
Takanashi et al.

[54] THERMAL TRANSFER COLOR RECORDER

[75] Inventors: Itsuo Takanashi; Hideshi Tanaka; Terumi Ohara, all of Yokohama; Shigeru Kato, Hino; Toshinori Takahashi, Kawasaki; Tsutomu Kiuchi, Yokohama; Hiroki Kitamura, Tokyo, all of Japan

[73] Assignee: Victor Company of Japan, Ltd., Japan

[21] Appl. No.: 676,003

[22] Filed: Nov. 29, 1984

[30] Foreign Application Priority Data

Dec. 2, 1983 [JP] Japan ................... 58-227969

[51] Int. Cl.⁴ .................... G01D 15/10; B41J 3/10
[52] U.S. Cl. .................... 346/76 PH; 346/1.1; 400/120
[58] Field of Search .................... 346/76 PH; 400/120

[56] References Cited

U.S. PATENT DOCUMENTS 4,025,025  5/1977  Bartel et al. .................... 226/33
4,496,955  1/1985  Maeyama et al. ............. 346/76 PH

FOREIGN PATENT DOCUMENTS 57-69065  4/1982  Japan .................... 346/76 PH
57-69066  4/1982  Japan .................... 346/76 PH Primary Examiner—E. A. Goldberg
Assistant Examiner—Gerald E. Preston
Attorney, Agent, or Firm—Andrus, Sceales, Starke & Sawall

[57] ABSTRACT

A method and apparatus for performing a thermal transfer recording, uses an ink ribbon having a plurality of ink parts which are coated with ink of different colors. The ink parts are successively arranged in a longitudinal direction of the ink ribbon. First, when performing a recording with a first color ink, an information is recorded on a recording paper by use of the first color ink, and at the same time, synchronization marks are also recorded by use of the first color ink. Next, when performing a recording with a second color ink, the information is recorded on the recording paper which is pre-recorded with the first color ink, by use of a second color ink, in synchronism with the synchronization marks which are detected.

7 Claims, 11 Drawing Figures

THERMAL TRANSFER COLOR RECORDER

BACKGROUND OF THE INVENTION

The present invention generally relates to methods and apparatuses for performing thermal transfer recordings, and more particularly to a method and apparatus for accurately performing a thermal transfer recording (printing) according to a frame sequential system with respect to recording positions of three colors.

Conventionally, as systems for performing a thermal transfer recording, there are systems such as a frame sequential recording system, a line sequential recording system, a dot sequential recording system, and the like. Basically, the frame sequential recording system may be divided into a multi-path type which employs a single thermal printing head (TPH, hereinafter simply referred to as a thermal head) and performs the recording with respect to each of three colors, and a single-path type which employs three thermal heads and simultaneously performs the recording with respect to the three colors. Between the multi-path type and the single-path type, the thermal transfer recording which uses the frame sequential recording system of the multi-path type is being reduced to practice, and the present invention relates to an improvement of such a thermal transfer recording system.

A conventional recording apparatus which employs the thermal transfer recording system of the type described before, uses an ink ribbon. The ink ribbon comprises a base film on which solid ink having the three primary printing colors of yellow, magenta, and cyan, are successively and repeatedly coated on the base film in respective ink parts over a predetermined area along the longitudinal direction of the base film. A mark is provided on one side edge of the ink ribbon where the base film is not coated with the ink. The ink parts coated with the ink of the three primary colors constitute a group, and the mark is provided on the ink ribbon at a position corresponding to a starting end of each group. For example, the mark is provided on the ink ribbon at a position corresponding to a starting end of the yellow ink part in each group. In the recording apparatus, a recording paper which is an ordinary paper, is wound around a platen. The thermal head is arranged at a position opposing the platen, with the ink ribbon interposed between the thermal head and the platen. The thermal head extends along the width direction of the recording paper and the ink ribbon, and comprises a predetermined number of heating resistor elements, which predetermined number is equal to a number of picture elements constituting one line which is to be recorded. Position sensors are provided in the recording apparatus, at such positions that the mark on the ink ribbon is detectable by the position sensors.

When the position sensors detect the mark on the ink ribbon, the thermal head is heated after a time delay which is equal to a time it takes for the detected mark to reach a position in correspondence with the thermal head, and an information is first recorded with the yellow ink on the recording paper which is wound around the platen which rotates. In this state, predetermined heating resistor elements among a large number of heating resistor elements of the thermal head, are heated responsive to a recording signal. As a result, the predetermined heating resistor elements which correspond to the picture elements which are to be recorded, heat and melt the yellow ink on the yellow ink part of the ink ribbon and transfer the melted yellow ink into the recording paper. The platen is intermittently rotated by a step motor in synchronism with the feeding of the ink ribbon, and the recording with the yellow ink is performed in terms of one line. The recording with the yellow ink is performed along the longitudinal direction of the recording paper, and a predetermined number of lines are recorded on the recording paper. The length of each ink part of the ink ribbon (that is, the length of the ink part of the ink ribbon along the longitudinal direction thereof for each color), is set equal to the circumference of the platen. Thus, a starting end of a subsequent color ink part of the ink ribbon, the magenta ink part, for example, assumes a position in correspondence with a starting end of the recording paper which is pre-recorded with the yellow ink. Next, the information is recorded with the magenta ink on the recording paper which is pre-recorded with the yellow ink. Similarly, the information is recorded with the cyan ink on the recording paper which is pre-recorded with the yellow ink and the cyan ink, and the recording with the ink of the three primary colors with respect to the same recording paper is completed in this manner.

According to the conventional recording apparatus described heretofore, the recording of the information with the yellow ink is completed as the platen undergoes one revolution. The information is recorded with the subsequent magenta ink as the platen undergoes another revolution, and the information is recorded with the cyan ink as the platen undergoes still another revolution. However, it is extremely difficult to record the information with the ink of the three primary colors on exactly the same line, and there is a problem in that the recordings made by the ink of the three primary colors may not perfectly overlap with one another. In other words, the recording positions of the recordings made by the ink of the three primary colors may easily deviate from one another.

This problem may be overcome to a certain extent by improving the mechanical precisions of the platen, a mechanism for feeding the ink ribbon, and the like. However, there is a limit in improving the mechanical precision. The recording paper may shift from the clamped position on the platen as the platen rotates, and the recording paper may expand or contract due to the effects of the ink and the thermal head, depending on the quality of the recording paper. Moreover, the platen itself may become deformed after numerous recording operations. Generally, the recording positions of the recordings made by the ink of the three primary colors deviate from one another due to these causes when no measures are taken against these causes so as to control the recording positions of the recordings made by the ink of the three primary colors.

SUMMARY OF THE INVENTION

Accordingly, it is a general object of the present invention to provide a novel and useful method and apparatus for performing a thermal transfer recording, in which the problems described heretofore are eliminated.

Another and more specific object of the present invention is to provide a method and apparatus for performing a thermal transfer recording, according to which a recording is made on a recording paper by use of an ink ribbon coated with ink of three primary colors, where the ink ribbon comprises a plurality of successive ink parts. Each ink part is coated with one of the three primary colors. A group is constituted by an ink part coated with a first color ink, an ink part coated with a second color ink, and an ink part coated with a third color ink. A plurality of such groups are formed along the longitudinal direction of the ink ribbon. Synchronization marks are recorded on side edges of the recording paper by the first color ink of the group, simultaneously as when an information is recorded on the recording paper by the first color ink. Next, the prerecorded synchronization marks are detected when recording the information with the remaining second color ink and the third color ink of the group, so as to heat heating resistor elements of a thermal printing head in synchronism with the detected synchronization marks. According to the method and apparatus of the present invention, the synchronization marks are recorded with a predetermined pitch for the entirety of one picture, with the first color ink. Thus, when recording the information with the remaining second color ink and the third color ink after the information is recorded with the first color ink, the recording positions of the recordings made by the ink of the three colors will not deviate from one another, and it is possible to record a color picture in a satisfactory manner. Even when the position of the recording paper deviates from the correct position for some reason, and even when the recording paper expands or contracts, the recording positions of the recordings made by the ink of the three colors will not deviate from one another because the heating of the heating resistor elements is constantly controlled in synchronism with the detected synchronization marks.

Still another object of the present invention is to provide a method and apparatus for performing a thermal transfer recording, according to which the ink part coated with the first color ink has a width which is larger than the widths of the ink parts coated with the remaining second color ink and the third color ink. The thermal printing head which is used, comprises a large number of heating resistor elements which are arranged for the width with which the information is to be recorded with the ink of the three colors, heating resistor elements which oppose the ink part coated with the first color ink on the ink ribbon and record the synchronization marks, and detecting elements for optically detecting the synchronization marks.

Other objects and further features of the present invention will be apparent from the following detailed description when read in conjunction with the accompanying drawings.

DETAILED DESCRIPTION

Figure 1:
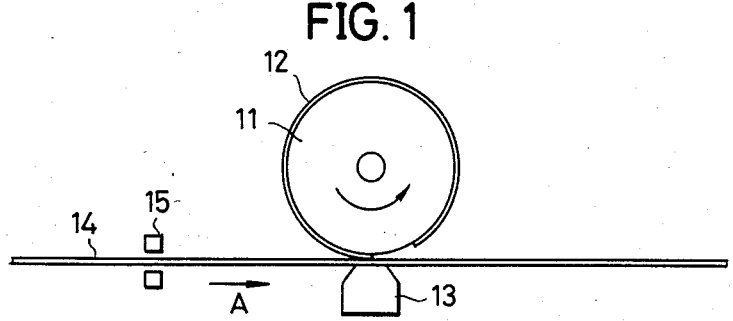
FIG. 1 is a general side view showing an embodiment of a recording apparatus capable of performing a thermal transfer recording according to the method of the present invention.
Figure 6:
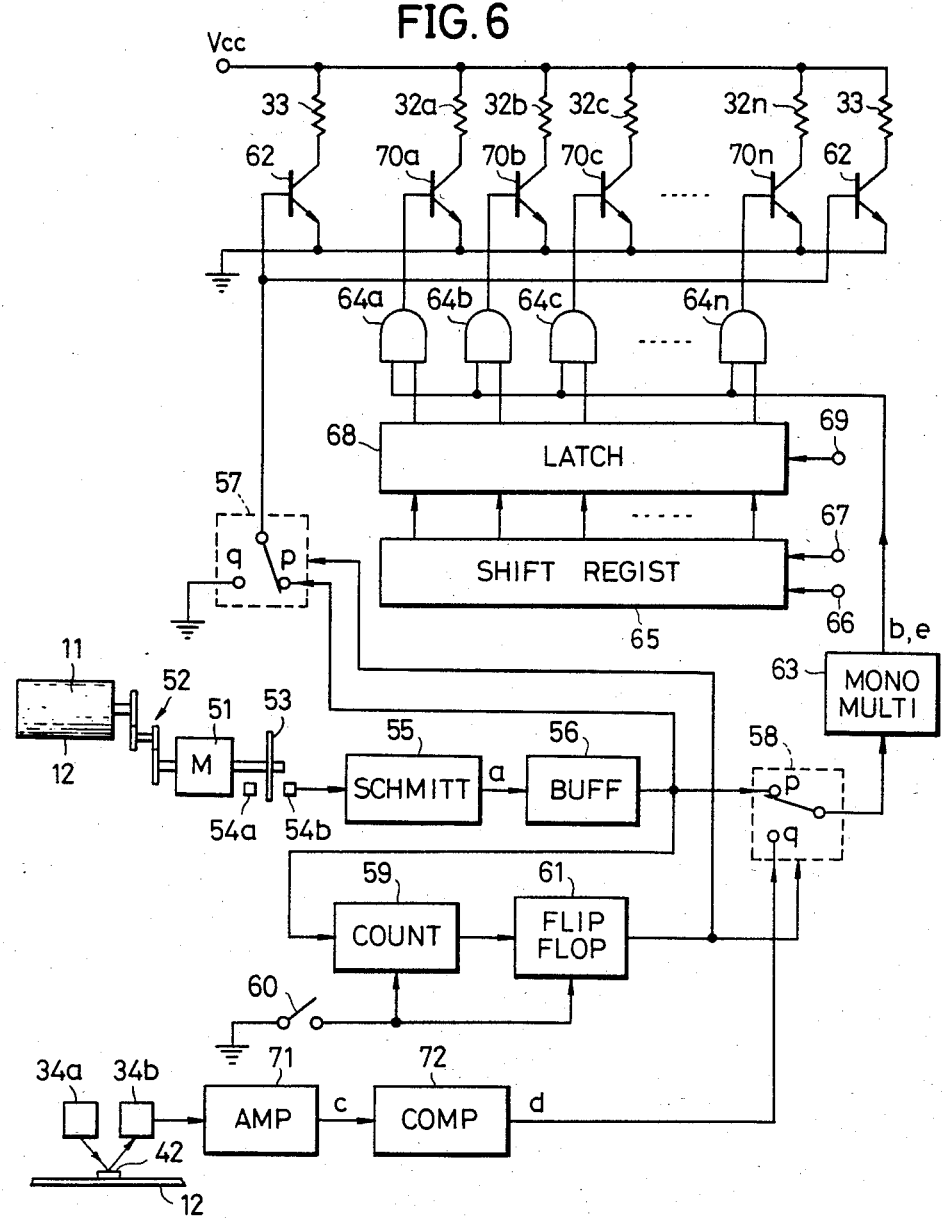
FIG. 6 is a circuit diagram showing an embodiment of a control circuit for controlling the thermal head of the recording apparatus shown in FIG. 1.

In FIG. 1, a platen 11 is rotated counterclockwise by a D.C. motor (a motor 51 shown in FIG. 6). A recording paper 12 is wound around the platen 11. A thermal head 13 which will be described later on in the specification, is arranged at a position opposing the platen 11. An ink ribbon 14 is fed in the direction of an arrow A, between the platen 11 and the thermal head 13, and is taken up by a take-up roller (not shown). A pair of position sensors 15 and 15 are provided at positions in correspondence with one side edge of the ink ribbon 14, so that the position sensors 15 and 15 oppose each other with the ink ribbon 14 interposed therebetween.

Figure 2:
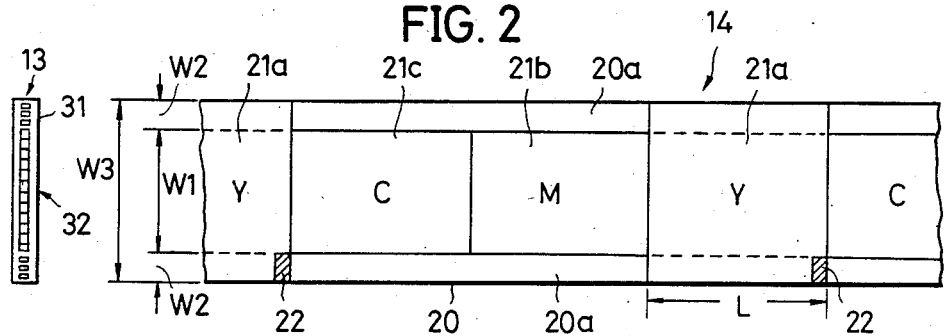
FIG. 2 is a plan view showing an ink ribbon which is used in the recording apparatus according to the present invention.

As shown in FIG. 2, the ink ribbon 14 comprises a transparent base film 20 having a width $W_3$ which is approximately equal to the width of the recording paper 12. For example, the base film 20 is made of polyester. A first ink part 21a coated with yellow (Y) ink and having the width $W_3$, is formed on the base film 20 over a predetermined length L which is approximately equal to the circumference of the platen 11. A second ink part 21b is coated with magenta (M) ink and having a width $W_1$ which is smaller than the width $W_3$, is formed on the base film 20 over the length L. Further, a third ink part 21c coated with cyan (C) ink and having the width $W_1$, is formed on the base film 20 over the length L. A group of ink parts is constituted by the first through third ink parts 21a through 21c, and a plurality of groups of ink parts are successively formed in the longitudinal direction of the base film 20. In actual practice, a blank part which is not coated with ink, is formed between two adjacent groups. In other words, the blank part is formed between a cyan ink part 21c of a certain group and a yellow ink part 21a of a group which is immediately subsequent to the certain group. However, for convenience' sake, the illustration of such blank parts is omitted in FIG. 2. A blank part 20a having a width $W_2$ ($=(W_3-W_1)/2$) is formed on both sides of the magenta and cyan ink parts 21b and 21c. A black position mark 22 is formed within a range of the width $W_2$, at a starting end of the yellow ink part 21a.

Figure 3:
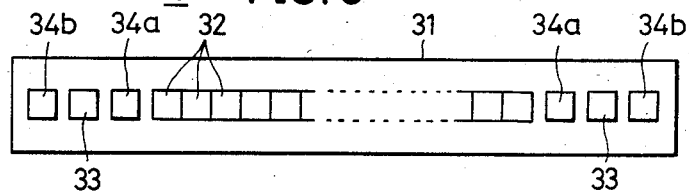
FIG. 3 is a plan view showing a thermal head of the recording apparatus shown in FIG. 1.

As shown in FIGS. 2 and 3, the thermal head 13 comprises a main head body 31, and a plurality of heating resistor elements (hereinafter simply referred to as heating elements) 32 which are arranged in a row for a width (length) which is the same as the widths $W_1$ of the magenta and cyan ink parts 21b and 21c of the ink ribbon 14. The number of heating elements 32 is determined by the number of picture elements constituting one line which is to be recorded. As will be described later, predetermined heating elements among the plurality of heating elements 32 are heated responsive to a recording signal. A pair of heating elements 33 and 33 for recording synchronization marks, are arranged on the main head body 31 in the same row as the heating elements 32, at positions corresponding to the widths $W_2$ of the respective blank parts 20a and 20a of the ink ribbon 14. Further, a light emitting element 34a and a light receiving element 34b are provided on both sides of each heating element 33.

In the recording apparatus having the construction described heretofore, one end of the recording paper 12 is clamped by a clamper (not shown) of the platen 11 when starting a thermal transfer recording. In this state, the platen 11 is stopped at a position which is a predetermined distance before a position where the recording is to be started. This predetermined distance is equal to the distance between the thermal head 13 and the sensors 15 and 15. The ink ribbon 14 is fed in the direction of the arrow A in FIG. 1, and the platen 11 starts to rotate when the position mark 22 is detected by the position sensors 15 and 15. Accordingly, the thermal head 13 opposes the position on the recording paper 12 where the recording is to be started, when the position mark 22 reaches a position opposing the thermal head 13. Then, the predetermined heating elements among the plurality of heating elements 32 of the thermal head 13 are heated responsive to the recording signal. As a result, the yellow ink on the yellow ink part 21a is melted by the heated heating elements over the width $W_1$, and the yellow ink is melted and transferred onto the recording paper 12 which is wound around the platen 11. In this state, the heating elements 33 and 33 are also heated, and thus, the yellow ink on the yellow ink part 21a is melted over the width $W_2$ at both sides of the ink ribbon 14 and is transferred onto the recording paper 12. The heating elements 32 are selectively heated depending on the information which is to be recorded on each line, and the recording which uses the yellow ink part 21a is performed for the entire length of the recording paper 12.

Figure 4:
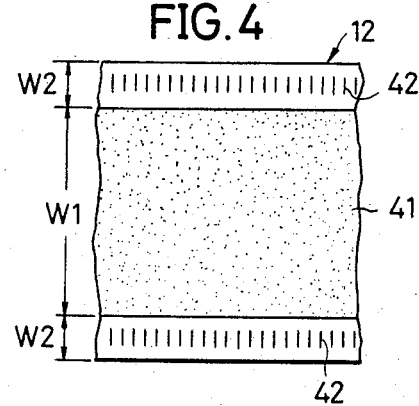
FIG. 4 shows a recording pattern formed on a recording paper by the thermal head shown in FIG. 3 with an ink of a first color.

FIG. 4 shows a recording pattern which is formed on the recording paper 12, when the recording which uses the yellow ink part 21a is performed for the entire length of the recording paper 12. The information is recorded by the heating elements 32 with the yellow ink throughout a recording range 41 on the recording paper 12, which recording range 41 has the width $W_1$. In addition, synchronization marks 42 are recorded by the heating elements 33 and 33 with the yellow ink, within respective ranges of the widths $W_2$ on both sides of the ink ribbon 14.

Figure 5:
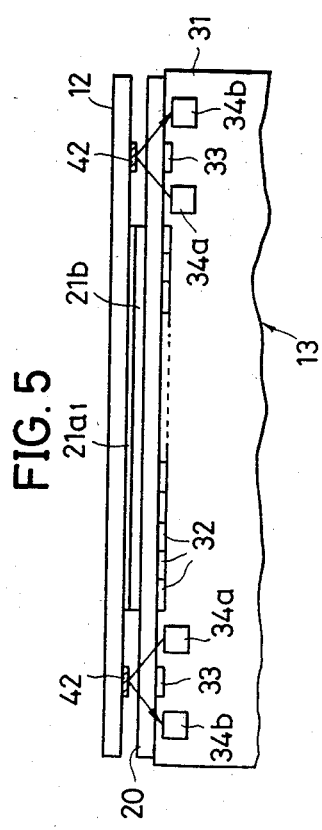
FIG. 5 shows the recording paper, an ink ribbon, and the thermal head in a vertical cross section, for explaining a state wherein a synchronization mark is detected during the recording performed with ink of the other two colors.

The platen 11 is rotated over exactly one revolution when the recording which uses the yellow ink part 21a is completed, and in this state, a starting end of the recording paper 12 assumes a position opposing a starting end of the magenta ink part 21b. Accordingly, the heating elements 32 perform the recording over the recording range 41 by use of the magenta ink part 21b, and melts and transfers the magenta ink over a yellow ink 21a1 which is pre-recorded on the recording paper 12 as shown in FIG. 5. As the heating elements 32 perform the recording which uses the magenta ink part 21b, lights emitted from the light emitting elements 34a and 34a pass through the transparent base film 20, are reflected by the recording paper 12, and are received by the respective light receiving elements 34b and 34b. The synchronization marks 42 are detected from a change in the quantity (intensity) of light received by each light receiving element 34b. As will be described later, the heating of the heating elements 32 is controlled in synchronism with the detection of the synchronization marks 42. For this reason, it is possible to accurately perform a thermal transfer recording by use of the magenta ink part 21b with respect to each line, so that the recording positions of the yellow and magenta do not deviate from each other.

After the recording which uses the magenta ink part 21b is completed, a recording which uses the cyan ink part 21c is performed. When the recording which uses the cyan ink part 21c is completed, the recording paper 12 is removed from the platen 11, and another new recording paper is clamped on the platen 11.

The synchronization marks 42 may be recorded with an ink other than the yellow ink. However, it is desirable to record the synchronization marks 42 with an ink of a color which is least conspicuous among the three primary colors of yellow, magenta, and cyan, because the synchronization marks 42 are unrelated to the information which is recorded on the recording paper 12. Thus, it is desirable to record the synchronization marks 42 by the yellow ink which has a large chroma and is bright in color.

Figure 7:
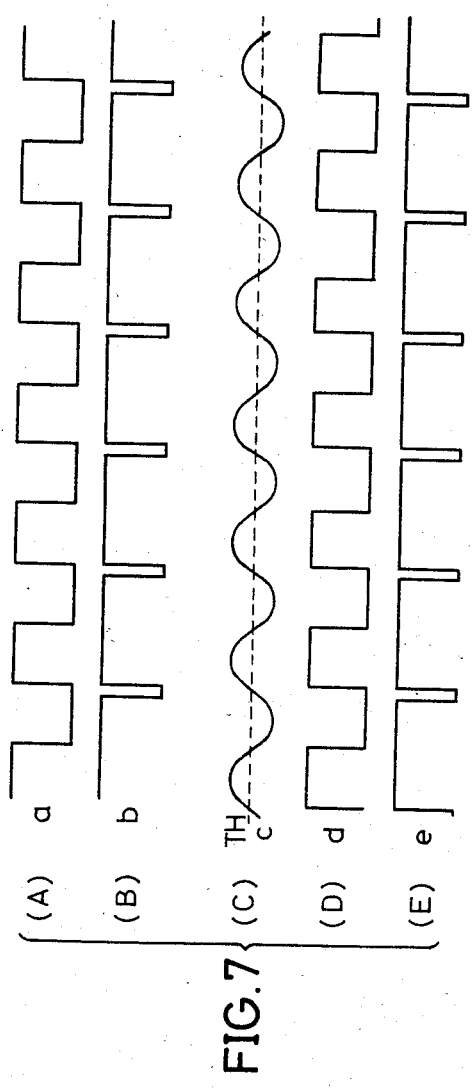
FIGS. 7(A) through 7(E) show signal waveforms at parts of the circuit shown in FIG. 6.

Description will now be given with respect to an embodiment of a circuit which is capable of performing the recording operation described heretofore, by referring to FIG. 6. In FIG. 6, the platen 11 is continuously rotated by a D.C. motor 51 through a gear mechanism 52 which is coupled to one end of a rotary shaft of the motor 51. A slit plate 53 comprising a plurality of slits, is provided on the other end of the rotary shaft of the motor 51, and is unitarily rotatable with the motor 51. A light emitting element 54a and a light receiving element 54b are arranged to oppose each other with the slit plate 53 interposed therebetween. When the motor 51 rotates, a pulse signal is produced from the light receiving element 54b every time a light emitted from the light emitting element 54a is received by the light receiving element 54b through the slit of the slit plate 53. This pulse signal is supplied to a Schmitt trigger circuit 55 and triggers the Schmitt trigger circuit 55. A square wave pulse signal a shown in FIG. 7(A) is obtained from the Schmitt trigger circuit 55. The pulse signal a is passed through a buffer circuit 56, and is supplied to a counter 59 and to respective terminals p of switching circuits 57 and 58.

A switch 60 is linked to a start switch (not shown) which is closed when starting a recording. When the start switch is closed, the switch 60 closes temporarily, and the counter 59 and a flip-flop 61 are reset by the closing of the switch 60. Accordingly, when the start switch is closed, the motor 51 starts to rotate, and further, the counter 59 is reset. The counter 59 counts the pulse signal a every time the pulse signal a is produced from the Schmitt trigger circuit 55 as the motor 51 rotates. It will be assumed that 1700 pulse signals a, for example, are produced from the Schmitt trigger circuit 55 as the motor 51 rotates and the platen 11 undergoes one revolution. In this case, the counter 59 supplies one output pulse signal to the flip-flop 61 as a clock signal, when the counter 59 counts 1700 pulse signals a. An output level of the flip-flop 61 is low after the flip-flop 61 is reset by the closing of the switch 60, and the switching circuits 57 and 58 are connected to the respective terminals p responsive to the low-level output of the flip-flop 61. Thus, when the counter 59 counts 1700 pulse signals a and supplies the clock signal to the flip-flop 61, the output level of the flip-flop 61 becomes high, and the switching circuits 57 and 58 are accordingly connected to respective terminals q.

Until the start switch is closed, the motor 51 starts to rotate, and the platen 11 undergoes the first one revolution, the switching circuits 57 and 58 are connected to the respective terminals p. Hence, the output pulse signal a of the buffer circuit 56 is passed through the switching circuits 57 and 58, and is supplied to bases of transistors 62 and 62 and to a monostable multivibrator 63. The transistors 62 and 62 are turned ON during a high-level period of the pulse signal applied to the bases thereof, and are turned off during a low-level period of the pulse signal applied to the bases thereof. The heating elements 33 and 33 are coupled in series with the respective transistors 62 and 62. The heating elements 33 and 33 are applied with currents and are heated when the respective transistors 62 and 62 are turned ON, and record the synchronization marks 42 on the recording paper 12 by melting the yellow ink within the respective widths $W_2$ of the yellow ink part 21a and transferring the melted yellow ink onto the recording paper 12. The heating values, that is, the resistances of the heating elements 33 and 33, are selected so that dots of the synchronization marks 42 are smaller than dots recorded by heating elements 32a through 32n which will be described later, in order to prevent the synchronization marks 42 from becoming connected even when the synchronization marks 42 are recorded for each line.

On the other hand, the monostable multivibrator 63 is triggered responsive to a rise in the pulse signal a, and produces a signal b shown in FIG. 7(B). The signal b is supplied to one input terminal of each of AND gates 64a through 64n. A recording information signal from a terminal 66 is supplied to a shift register 65, and the information stored in the shift register 65 is successively shifted responsive to a clock signal from a terminal 67. The information stored in the shift register 65 is latched by a latch circuit 68 which is applied with a latch signal from a terminal 69, and each bit of an output recording information signal of the latch circuit 68 is supplied to the other input terminal of each of the AND gates 64a through 64n. The gates of the AND gates 64a through 64n are open during a high-level period of the signal b, so as to supply each bit of the output recording information signal of the latch circuit 68 to a base of each of transistors 70a through 70n. The transistors 70a through 70n are coupled in series with the respective heating elements 32a through 32n. A heating element which is coupled in series with a transistor which is turned ON, is heated. Accordingly, the yellow ink on the yellow ink part 21a is melted and transferred onto the recording paper 12 by predetermined heating elements among the heating elements 32a through 32n, which predetermined heating elements are selectively heated responsive to the recording information signal. The recording of the information by use of the yellow ink is performed for each line, and at the same time, the synchronization marks 42 are also recorded with the yellow ink for each line.

When the platen 11 undergoes exactly one revolution, the counter 59 finishes counting 1700 pulse signals a and produces the clock signal as described before. Thus, the flip-flop 61 produces a high-level signal, and the switching circuits 57 and 58 are connected to the respective terminals q. Thereafter, unless the switch 60 is closed and the counter 59 and the flip-flop 61 are reset, the flip-flop 61 continues to produce the high-level signal and the switching circuits 57 and 58 remain connected to the respective terminals q.

Accordingly, as the platen 11 undergoes the second and the third revolutions, the bases of the transistors 62 and 62 are grounded through the switching circuit 57 and are turned OFF. As a result, the heating elements 33 and 33 are no longer applied with currents, and the heating elements 33 and 33 will not be heated. On the other hand, the light receiving element 34b receives the light which is emitted from the light emitting element 34a and is reflected by the recording paper 12 or the synchronization marks 42 recorded on the recording paper 12, and detects the synchronization marks 42. An output detection signal of the light receiving element 34b is passed through an amplifier 71, and is supplied to a comparator 72 as a signal c shown in FIG. 7(C). The comparator 72 compares the signal c with a predetermined threshold level $T_H$, and accordingly subjects the signal c to a wave-shaping so as to produce a square wave signal d shown in FIG. 7(D). Since the square wave signal d is derived from the detection signal of the synchronization marks 42, the period of the square wave signal d is the same as the period of the square wave signal a which is used for the recording of the synchronization marks 42. The square wave signal d is supplied to the monostable multivibrator 63 through the switching circuit 58, and triggers the monostable multivibrator 63. Therefore, a signal e shown in FIG. 7(E), which has the same waveform as the signal b, is supplied to one input terminal of each of the AND gates 64a through 64n.

Then, an information signal related to the recording which is to be performed by use of the magenta ink, is applied to the terminal 66. As in the case described before where the recording is performed by use of the yellow ink, predetermined heating elements among the heating elements 32a through 32n are applied with currents and are heated. The magenta ink on the magenta ink part 21b is melted by the predetermined heating elements which are heated, and the melted magenta ink is transferred onto the recording paper 12.

When the recording which uses the magenta ink is completed and the platen 11 completes the second revolution, the platen 11 undergoes the third revolution. As the platen 11 undergoes the third revolution, the recording which uses the cyan ink on the cyan ink part 21c, is performed similarly as the recording which uses the magenta ink. When the recording which uses the cyan ink is completed, the rotation of the motor 51 is stopped, and the recording paper 12 which is recorded with the recording information by use of the ink of three colors is removed from the platen 11.

Further, the present invention is not limited to these embodiments, but various variations and modifications may be made without departing from the scope of the present invention.

What is claimed is:

1. An apparatus for performing thermal transfer recording by use of an ink ribbon having a plurality of ink parts which are coated with ink of different colors, said ink parts being successively arranged in a longitudinal direction of the ink ribbon, a first ink part of said plurality of ink parts being coated with a first color ink and having a width $W_3$ which is larger than a width $W_1$ of a second ink part of said plurality of ink parts, which second ink part is coated with a second color ink of a predetermined width $W_2$, said apparatus comprising:

a thermal printing head for carrying out a recording operation in which information is recorded in one line on a piece of recording paper with each one of said inks of different colors at a time, said thermal printing head comprising a main head body, a plurality of information recording heating resistor elements arranged in one line on said main head body over a range which is essentially the same as said width $W_1$, for recording the information by melting each color ink coated on the ink parts and successively transferring the melted ink onto the recording paper, one or a plurality of mark recording heating resistor elements provided on said main head body at one or a plurality of positions within a range of said predetermined width $W_2$, for recording at least one synchronization mark on the recording paper by melting the first color ink coated on the first ink part within said predetermined width $W_2$ and transferring the melted ink onto the recording paper, and detecting means for detecting a pre-recorded synchronization mark on the recording paper, said one or the plurality of mark recording heating resistor elements and said detecting means being in line with said plurality of information recording heating resistor elements;

displacing means for displacing said recording paper and said ink ribbon passing over said thermal printing head so that said recording paper is successively contacting one of said ink parts; and control means for controlling heating of said information recording heating resistor elements and said one or the plurality of mark recording heating resistor elements in response to the displacement of the recording paper and said ink ribbon to carry out a printing operation such that said information is printed on said recording paper in said different colors in succession starting with said first color ink and said at least one synchronization mark is printed on said recording paper and is synchronized with a start of printing with said first color, said control means after a completion of the printing operation with the first color, controlling heating of said information recording heating resistor elements in response to a signal from said detection means so that said printing operation is continued with said second color ink started in synchronism with a detection of said previously printed synchronization mark.

2. An apparatus as claimed in claim 1 in which said control means comprises a first circuit for producing a gate signal responsive to said at least one synchronization mark detected by said detecting means, a gate circuit for gating and passing a recording information signal during a period in which the gate signal from said first circuit exists, and a second circuit for applying a current and heating predetermined information recording heating resistor elements among said information recording heating resistor elements depending on the recording information signal which is passed through said gate circuit.

3. An apparatus as claimed in claim 1 in which said displacing means comprises a platen on which said recording paper is wound, said platen undergoing one revolution every time a printing is performed by use of each of said different color ink, and a motor for rotating said platen, and said control means comprises a first circuit for detecting the rotation of said motor and for producing a synchronization mark recording signal based on the detected rotation, and a second circuit for applying a current and heating said one or plurality of mark recording heating resistor elements responsive to the synchronization mark recording signal produced from said first circuit only when performing a recording by use of said first color ink.

4. An apparatus as claimed in claim 1 in which said detecting means comprises a light emitting element and a light receiving element, and said light emitting element and said light receiving element are disposed on both sides of said mark recording heating resistor element so that said mark recording heating resistor element is interposed between said light emitting element and said light receiving element.

5. A method of performing a thermal transfer recording by use of an ink ribbon having a plurality of ink parts which are coated with ink of different colors and a heatable thermal printing head for carrying out a recording operation in which information is recorded in one line on a piece of recording paper with each one of said inks of different color at a time, said ink parts being successively arranged in a longitudinal direction of the ink ribbon, said method carrying out a recording operation such that said information is printed on said recording paper in said different colors in succession starting with said first color ink, said method comprising:

a first recording step of repeatedly carrying out the recording operation by use of a first color ink and said thermal printing head so that said recording paper and said ink ribbon passing over said thermal head are displaced so that said recording paper is successively contacting one of said ink parts, said first recording step recording at least one synchronization mark by use of the first color ink simultaneously with each of the repeated recording operations so that said at least one synchronization mark is printed on said recording paper and is synchronized with a start of printing with said first color, and a second recording step of repeatedly carrying out the recording operation by use of a second color ink and said thermal printing head so as to control heating of said thermal printing head in response to a detection of the recorded synchronization mark so that said printing operation is continued with said second color ink started in synchronism with a detection of said previously printed synchronization mark.

6. A method as claimed in claim 5 in which said ink ribbon has ink parts which are coated with ink of three primary colors, a first ink part coated with the first color ink is wider than the width of an ink part coated with either of the two remaining color ink by a predetermined width, and said first recording step records said at least one synchronization mark by use of the first color ink coated on the first ink part within the predetermined width.

7. A method as claimed in claim 6 in which said ink ribbon has ink parts which are coated with ink of three primary colors of yellow, magenta, and cyan, said first color ink is a yellow ink, and said at least one synchronization mark are recorded with the yellow ink.

* * * * *